(12) United States Patent
Musgrove et al.

(10) Patent No.: US 8,619,338 B2
(45) Date of Patent: Dec. 31, 2013

(54) SYSTEMS AND METHODS FOR TRANSMITTING DEVICE, NETWORK PATH, TRANSMITTAL OPTION AND/OR RECEIVING DEVICE PROTOCOL SELECTION

(75) Inventors: Ralph Musgrove, Aventura, FL (US); Christopher C. Moore, Seattle, WA (US)

(73) Assignee: Blue Ribbon IP LLC, Seattle, WA (US)

( * ) Notice: Subject to any disclaimer, the term of this patent is extended or adjusted under 35 U.S.C. 154(b) by 748 days.

(21) Appl. No.: 12/351,721

(22) Filed: Jan. 9, 2009

(65) Prior Publication Data

US 2010/0177338 A1 Jul. 15, 2010

(51) Int. Cl.
*G06F 3/12* (2006.01)
*H04N 1/00* (2006.01)
*H04L 12/66* (2006.01)

(52) U.S. Cl.
USPC .......... 358/406; 358/407; 358/468; 358/1.15; 379/100.01; 370/252

(58) Field of Classification Search
USPC ............ 358/406, 468, 1.15, 407; 379/100.12, 379/100.01, 100.07, 100.15, 100.17; 370/238, 244, 250, 252, 400, 401, 467
See application file for complete search history.

(56) References Cited

U.S. PATENT DOCUMENTS

| | | | | |
|---|---|---|---|---|
| 5,847,844 A * | 12/1998 | Minamizawa | ................. | 358/442 |
| 6,456,594 B1 * | 9/2002 | Kaplan et al. | ................. | 370/238 |
| 6,747,761 B1 * | 6/2004 | Ranalli et al. | ................. | 358/434 |
| 6,917,594 B2 * | 7/2005 | Feuerstraeter et al. | ....... | 370/244 |
| 7,099,438 B2 * | 8/2006 | Rancu et al. | ....................... | 379/9 |
| 7,154,625 B2 * | 12/2006 | El-Gazzar et al. | ........... | 358/1.15 |
| 7,412,034 B2 * | 8/2008 | Rancu et al. | ........................ | 379/9 |
| 7,733,522 B2 * | 6/2010 | Irons et al. | ..................... | 358/1.9 |
| 7,983,155 B2 * | 7/2011 | Zaniolo et al. | ................ | 370/229 |
| 7,995,611 B2 * | 8/2011 | Hollatz et al. | ................ | 370/466 |
| 8,164,785 B2 * | 4/2012 | Ferlitsch | ........................ | 358/1.6 |
| 8,184,633 B2 * | 5/2012 | Ionescu et al. | ................ | 370/392 |
| 8,270,012 B2 * | 9/2012 | Martin et al. | ................ | 358/1.15 |
| 8,390,839 B2 * | 3/2013 | Tomita | ......................... | 358/1.15 |
| 2003/0231741 A1 * | 12/2003 | Rancu et al. | ........................ | 379/9 |
| 2004/0105118 A1 * | 6/2004 | El-Gazzar et al. | ........... | 358/1.15 |
| 2004/0130755 A1 * | 7/2004 | Hirokawa | ...................... | 358/404 |
| 2004/0151293 A1 * | 8/2004 | Jensen et al. | ............. | 379/114.02 |
| 2004/0252348 A1 * | 12/2004 | Desai | ............................ | 358/400 |
| 2004/0255014 A1 * | 12/2004 | Motoyama et al. | ........... | 709/223 |
| 2005/0275852 A1 * | 12/2005 | Ferlitsch | ........................ | 358/1.6 |
| 2006/0072709 A1 * | 4/2006 | Rancu et al. | ................ | 379/9.01 |
| 2007/0280122 A1 * | 12/2007 | Ito | ................................ | 370/250 |
| 2009/0073499 A1 * | 3/2009 | Glunz | ............................ | 358/400 |
| 2010/0091679 A1 * | 4/2010 | Ionescu et al. | ................ | 370/252 |

\* cited by examiner

*Primary Examiner* — Kimberly A Williams
(74) *Attorney, Agent, or Firm* — Steven M. Greenberg, Esq.; Carey, Rodriguez, Greenberg & O'Keefe, LLP (57) ABSTRACT

Disclosed herein are systems and methods related to data communication. A method includes consulting a database for information relating to the performance history of one or more facsimile transmitting devices. The database includes a performance score for one or more facsimile transmitting devices, and the performance score reflects the success or failure of a transmission of a data communication for an individual one of one or more facsimile transmitting device. The method further includes using the performance score to select an individual facsimile transmitting device from the one or more facsimile transmitting devices and attempting to transmit the data communication using the selected individual facsimile transmitting device.

8 Claims, 8 Drawing Sheets

SYSTEMS AND METHODS FOR TRANSMITTING DEVICE, NETWORK PATH, TRANSMITTAL OPTION AND/OR RECEIVING DEVICE PROTOCOL SELECTION

FIELD OF THE INVENTION

Disclosed herein are systems and methods related to electronic voice or data communication. More specifically, the systems and methods disclosed herein relate to the selection of transmitting devices, communication network paths, transmittal options and/or receiving device protocols for electronic voice or data communication.

BACKGROUND OF THE INVENTION

Electronic voice or data communication is a common method of modern communication. As an example, one type of electronic voice or data communication, electronic facsimile transmission (commonly known as FAX), has become a popular and convenient method for sending documents to remote users over communication networks. As communication technology has evolved, electronic facsimile devices and the networks and transmittal options associated with them have become more diverse. While these devices, networks, transmittal options and protocols have significantly expanded, however, the management of selecting which devices, communication network paths, transmittal options and/or receiving protocols to use in transmitting a particular facsimile document has not. For example, presently the particular communication network path that is used is not chosen based on beneficial characteristics such as reliability, efficiency or speed. Instead, facsimile communications are sent over default communication network paths based on the unique addressing identifier associated with the receiving device (such as its telephone number) and the default facsimile transmitting device being used. By only relying on the addressing identifier of the receiving facsimile device and the default facsimile transmitting device to "select" the communication network path, however, other options are ignored. As stated, these ignored communication network paths may be preferable, having beneficial characteristics such as greater reliability, efficiency, speed, or better compatibility with the facsimile transmitting device and/or facsimile receiving device. Further, facsimile protocols have also become more sophisticated, offering a variety of transmittal options such as, without limitation, color, and variable transmission speeds and compression ratios. These options can likewise affect transmission reliability, efficiency, speed and device compatibility. Presently, however, these considerations are not taken into account in selecting appropriate transmitting devices, network paths or receiving device protocols. Thus, there is room for improvement in facsimile document transmission by allowing for selection of preferred transmitting devices, communication network paths, transmittal options and/or receiving device protocols based on reliability, efficiency, speed, compatibility or other parameters. The systems and methods disclosed herein can also be applied to other types of voice or data communications as well.

SUMMARY OF THE INVENTION

The systems and methods disclosed herein allow the collection, storage and use of data regarding attempted electronic voice or data transmissions. The collected and stored data can be used to select a transmitting device, a communication network path, transmittal options, and/or receiving device protocols to send or receive a subsequent electronic voice or data communication based on a parameter such as reliability, efficiency, speed, compatibility or quality of previous transmissions over particular transmitting devices, communication network paths, transmittal options and/or receiving device protocols. Specifically, the systems and methods disclosed herein allow for the discovery and selection of one or more of a preferred electronic voice or data transmitting device (from a plurality of available transmitting devices), a preferred communication network path (from a plurality of available communication network paths), preferred transmittal options (from a plurality of available transmittal options) and/or preferred receiving device protocols (from a variety of available receiving device protocols) that has or have, based upon historic performance, performed well within a particular transmittal situation. In allowing the discovery and selection of a mutually-compatible and preferred transmitting device, communication network path and/or transmittal options (the combination of which, for the sake of brevity can be referred to as a transmitting system), the disclosed systems and methods allow for electronic voice or data transmission over a transmitting system with preferred characteristics such as, greater reliability (i.e. lower failure rates), efficiency, speed, better compatibility or other parameters such as quality and/or availability. The systems and methods disclosed herein are equally applicable to inbound transmissions. In these embodiments the protocols of a receiving device can be selected based on the discovery and selection of a mutually-compatible protocol based on the origin of the transmission (when known) and the particular outbound transmitting system being used.

In one embodiment, the systems and methods disclosed herein allow for the selection preferences of both outbound and inbound transmitting system to be derived empirically. It is also the case, however, that a simple database of preferred transmitting devices, communication network paths, transmittal options and/or receiving device protocols for use under varying conditions could be implemented.

To accomplish the aforementioned objectives the systems and methods disclosed herein utilize (i) receiving electronic voice or data devices and associated addressing identifiers by which the receiving devices can be contacted across one of a plurality of communication network paths; (ii) transmitting electronic voice or data devices adapted to use a plurality of communication network paths; (iii) a plurality of communication network paths; and (iv) a database for data (in one embodiment empirical data) with respect to the plurality of transmitting systems and/or components thereof in a particular attempted transmittal situation. The described elements can communicate using a number of available transmittal options and/or receiving device protocols.

Specifically, one embodiment disclosed herein includes a method comprising: consulting a database for information relating to the performance history of one or more of transmitting devices, communication network paths or transmittal options; selecting one or more of a transmitting device from a plurality of transmitting devices, a communication network path from a plurality of communication network paths or a transmittal option from a plurality of transmittal options based on the information; and attempting to transmit an electronic voice or data communication using the selected transmitting device, communication network path or transmittal option from a transmitting device to a receiving device over a communication network path.

In another embodiment, the information is empirically-gathered.

In another embodiment, the method further comprises updating the database with empirically-gathered information relating to one or more of the performance of the transmitting device, the performance of the communication network path, the performance of transmittal option or combinations thereof on the attempted transmission.

In another embodiment, the empirically-gathered information relates to the performance of a transmitting device in isolation, the performance of a transmitting device with a particular communication network path, the performance of a transmitting device with various transmittal options, the performance of a transmitting device with a particular receiving device, the performance of a transmitting device with a particular geographic area, the performance of a transmitting device during a chronological time, the performance of a transmitting device with a particular transmitting system or combinations of the foregoing.

In another embodiment, the transmitting device is a selected transmitting device.

In another embodiment, the empirically-gathered information relates to the performance of a communication network path in isolation, the performance of a communication network path with a particular transmitting device, the performance of a communication network path with various transmittal options, the performance of a communication network path with a particular receiving device, the performance of a communication network path with a particular geographic area, the performance of a communication network path during chronological times, the performance of a communication network path with a particular transmitting system or combinations of the foregoing.

In another embodiment, the communication network path is a selected communication network path.

In another embodiment, the empirically-gathered information relates to the performance of a transmittal option in isolation, the performance of a transmittal option with a particular transmitting device, the performance of a transmittal option with a particular communication network path, the performance of a transmittal option with a particular receiving device, the performance of a transmittal option with a particular geographic area, the performance of transmittal option during a chronological time, the performance of a transmittal option with a particular transmitting system or combinations of the foregoing.

In another embodiment, the transmittal option is a selected transmittal option.

In another embodiment, the transmitting device is a facsimile transmitting device. In another embodiment, the facsimile transmitting device is a fax card installed on a computer server or software utilizing a T.38 protocol.

Disclosed herein are also methods comprising detecting an incoming electronic voice or data communication directed to a receiving device;

detecting the source of the incoming electronic voice or data communication, the communication network path utilized to carry the incoming electronic voice or data communication or transmittal options utilized in the incoming electronic voice or data communication; and consulting a database for information relating to the performance history of one or more receiving device protocols in combination with the detected source of the incoming electronic voice or data communication, receiving device protocols in combination with the detected communication network path utilized to carry the incoming electronic voice or data communication, receiving device protocols in combination with detected transmittal options utilized in the incoming electronic voice or data communication; and adjusting the receiving protocols of the receiving device based on the consultation to maximize a parameter.

In another embodiment, the information is empirically-gathered.

In another embodiment, the method further comprises updating the database with additional empirically-gathered information relating to the performance of the receiving device protocols with the source of the incoming electronic voice or data communication, the performance of the receiving device protocols with the communication network path utilized to carry the incoming electronic voice or data communication, the performance of the receiving device protocols with transmittal options utilized in the incoming electronic voice or data communication or combinations thereof.

In another embodiment, the source of the incoming electronic voice or data communication is a particular transmitting device identified by a unique addressing identifier or the source of the incoming electronic voice or data communication is a type of transmitting device identified by information advertised by the transmitting device.

In another embodiment, the detecting comprises the detection of information about routing switches over which the communication was transmitted and/or the media gateway through which the communication was transmitted.

In another embodiment, the receiving device is a facsimile receiving device.

Also disclosed herein is a method comprising maintaining a database comprising empirically-gathered information relating to the performance of a transmitting device in isolation, the performance of a transmitting device with a particular communication network path, the performance of a transmitting device with various transmittal options, the performance of a transmitting device with a particular receiving device, the performance of a transmitting device with a particular geographic area, the performance of a transmitting device during a chronological time, the performance of a transmitting device with a particular transmitting system, the performance of a communication network path in isolation, the performance of a communication network path with a particular transmitting device, the performance of a communication network path with various transmittal options, the performance of a communication network path with a particular receiving device, the performance of a communication network path with a particular geographic area, the performance of a communication network path during a chronological time, the performance of a communication network path with a particular transmitting system, the performance of a transmittal option in isolation, the performance of a transmittal option with a particular transmitting device, the performance of a transmittal option with a particular communication network path, the performance of a transmittal option with a particular receiving device, the performance of a transmittal option with a particular geographic area, the performance of a transmittal option during a chronological time, the performance of a transmittal option with a particular transmitting system, the performance of receiving device protocols with a source of an incoming electronic voice or data communication, the performance of receiving device protocols with a communication network path utilized to carry incoming electronic voice or data communication, the performance of receiving device protocols with transmittal options utilized in an incoming electronic voice or data communication, the performance of receiving device protocols with a transmitting system or combinations of the foregoing.

In another embodiment, the method further comprises: allowing consultation of the database to maximize a parameter of an attempted electronic voice or data communication.

In another embodiment, the method further comprises configuring the database to be automatically updated following an attempted electronic voice or data communication.

In another embodiment, the attempted electronic voice or data communication is an attempted facsimile communication. In another embodiment, the attempted facsimile communication is transmitted utilizing a fax card installed on a computer server or software utilizing a T.38 protocol.

DETAILED DESCRIPTION OF THE INVENTION

Electronic voice or data communication is a common method of modern communication. As an example, one type of electronic voice or data communication, electronic facsimile transmission, has become a popular and convenient method for sending documents to remote users over communication networks. As communication technology has evolved, electronic facsimile devices and the networks, transmittal options and protocols associated with them have become more diverse. While these devices, networks, transmittal options and/or receiving device protocols have significantly expanded, the management of selecting which transmitting devices, communication network paths and/or transmittal options to use in transmitting a particular facsimile document has not. For example, presently the particular communication network path that is used is not chosen based on beneficial characteristics such as reliability, efficiency, or speed. Instead, facsimile communications are sent over default communication network paths based on the unique addressing identifier associated with the receiving device (such as its telephone number) and the default facsimile transmitting device being used. By only relying on the addressing identifier of the receiving facsimile device and the default facsimile transmitting device to "select" the communication network path, other options are ignored. As stated, these ignored communication networks may be preferable, having beneficial characteristics such as greater reliability, efficiency, speed, or better compatibility with the facsimile transmitting device. Further, facsimile transmittal options have become more sophisticated, offering a variety of transmittal options such as, without limitation color, and variable transmission speeds and compression ratios. These options can likewise affect transmission reliability, efficiency, cost and device compatibility. Presently, however, these considerations are not taken into account. The systems and methods disclosed herein provide improvements in facsimile document transmission by allowing for selection of preferred transmitting devices, communication network paths, transmittal options, and/or receiving device protocols based on reliability, efficiency, speed, compatibility or other parameters. The systems and methods disclosed herein can also be applied to other types of voice or data communications as well.

The systems and methods disclosed herein allow the collection, storage and use of data regarding particular attempted electronic voice or data transmissions. The collected and stored data can be used to choose a transmitting device, communication network path, transmittal options and/or receiving device protocols to send or receive a subsequent electronic voice or data message based on a parameter such as reliability, efficiency, speed, compatibility or quality of previous transmissions over particular transmitting devices, communication network paths, transmittal options and/or receiving device protocols.

Specifically, in relation to outbound systems, the systems and methods disclosed herein allow for the discovery and selection of a preferred transmitting device (from a plurality of available transmitting devices), a preferred communication network path (from a plurality of available communication network paths), and/or preferred transmittal options (from a plurality of available transmittal options) that have empirically, based upon historical performance, performed well within a particular transmittal situation. In relation to inbound systems, the systems and methods disclosed herein allow for the discovery and selection of preferred receiving device protocols (from a plurality of available receiving device protocols) that have empirically, based upon historical performance, performed well within a particular transmittal situation. In allowing the discovery and selection of a mutually-compatible and preferred transmitting device, communication network path, transmittal options and/or receiving device protocols, the systems and methods disclosed herein allow for electronic voice or data transmission over a transmitting system with preferred characteristics such as, greater reliability (i.e. lower failure rates), efficiency, better compatibility or other parameters such as quality and/or availability.

In one embodiment, the systems and methods disclosed herein also allow for selection preferences of the outbound and inbound transmitting system to be derived empirically. Empirical data collection can avoid problems related to manual data collection and entry and allows for automatic updates, so as to reduce data input and maintenance concerns. For instance, the gathering of data to populate and update such a database would be time consuming and even inaccurate if, for example, specified compatibilities were not empirically realized, unanticipated issues emerged as the various elements interacted, or if quality of services changed due to equipment or configuration changes. Thus, the systems and methods disclosed herein allow for the selection preferences of both outbound and inbound transmitting system to be derived empirically. Empirical data collection avoids the problems described above and allows for automatic updates that reduce these data input and maintenance concerns. It should be understood, however, that while empirical data collection and entry is a preferred embodiment herein, the present invention is not limited to empirical data collection and entry and can utilize manual data collection and entry.

To accomplish the aforementioned objectives the systems and methods disclosed herein utilize (i) receiving devices and associated addressing identifiers by which the receiving devices can be contacted across one of a plurality of communication network paths; (ii) transmitting devices adapted to use communication network paths; (iii) a plurality of communication network paths; and (iv) a database for storing data concerning the performance history of each of the plurality of transmitting systems and/or components thereof within a particular attempted transmittal situation. The described elements can communicate using a number of available transmittal options and/or receiving device protocols.

Specifically, one embodiment disclosed herein comprises allowing a management system to select a preferable transmitting device (from a plurality of transmitting devices) by consulting the database for data concerning the performance history of the transmitting devices. The selecting of the transmitting device can be based on a selection logic (such as, without limitation, a "best score" sort). Once a transmitting device is selected, the selected device contacts the receiving device over a communication network path.

Another embodiment disclosed herein comprises allowing a management system to select a preferable communication network path by consulting the database for data concerning the performance history of individual paths of the plurality of communication network paths. The selecting of the communication network path can be based on a selection logic (such as, without limitation, a "best score" sort). In one embodiment, once a communication network path is chosen, the management system then selects a transmitting device having the ability to communicate over the selected communication network path. The receiving device is contacted by the transmitting device through the selected communication network path.

Another embodiment disclosed herein comprises allowing a management system to select preferable transmitting options (from a plurality of transmitting options) by consulting the database for data concerning the performance history of the various transmitting options. The selecting of the transmitting options can be based on a selection logic (such as, without limitation, a "best score" sort). Once transmitting options are selected, a transmitting device contacts the receiving device over a communication network path using the selected transmitting options.

Another embodiment disclosed herein comprises allowing a management system to select one or more of a transmitting device, a communication network path and one or more transmitting options by consulting the database for data concerning the performance history of the various devices, communication network paths and transmitting options alone and/or in various combinations (including as an entire transmitting system). The selecting of the combination of elements or of the entire transmitting system can be based on a selection logic (such as, without limitation, a "best score" sort). Once a transmitting system or components thereof are selected, the selected system or components thereof contact the receiving device using the selected system or components thereof.

Another embodiment disclosed herein comprises allowing a management system to select preferable receiving device protocols (from a plurality of receiving device protocols) by consulting the database for data concerning the performance history of the various receiving device protocols. The selecting of the receiving device protocols can be based on a selection logic (such as, without limitation, a "best score" sort). Once receiving device protocols are selected, the receiving device receives the communication over a communication network path using the selected receiving device protocols.

Figure 1:
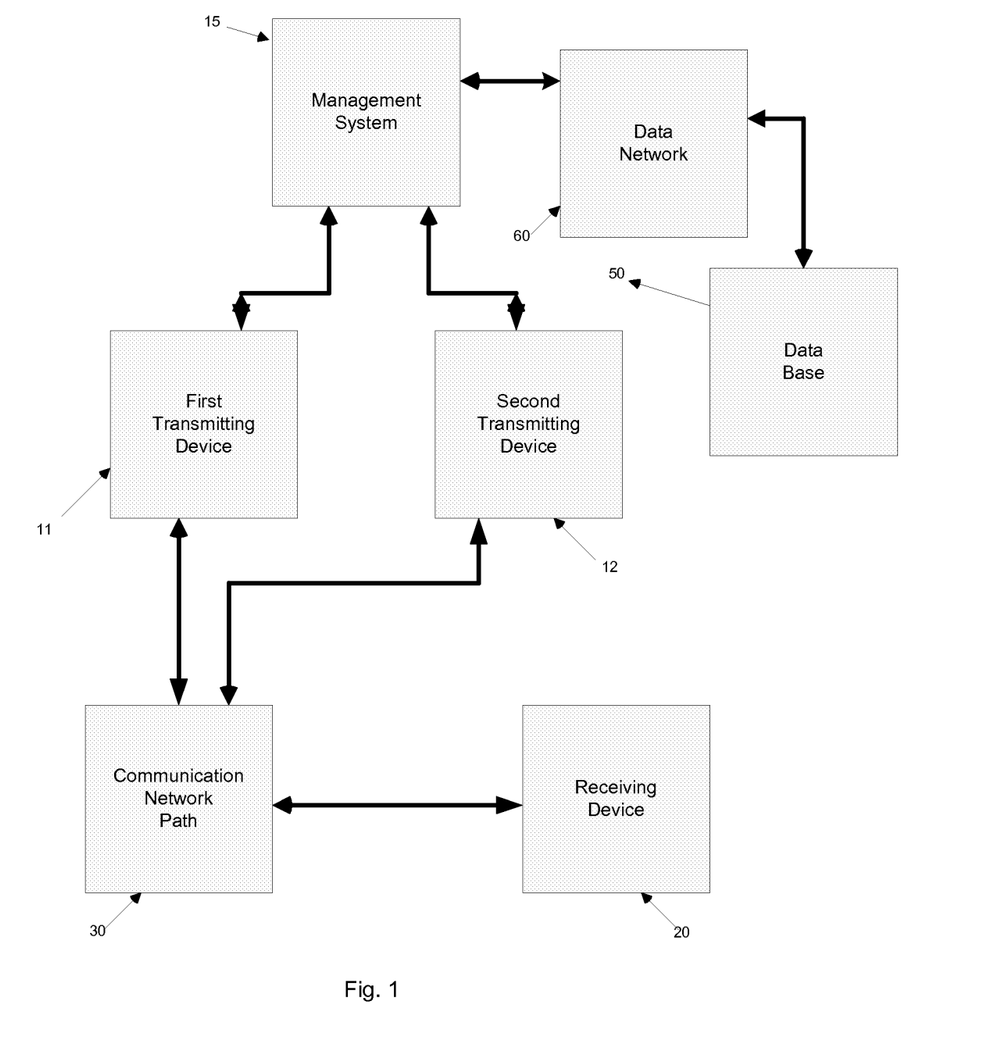
FIG. 1 depicts one embodiment of a system disclosed herein used to select a transmitting device.

FIG. 1 depicts one embodiment of an outbound transmitting system disclosed herein. This depicted embodiment utilizes (i) a plurality of alternative transmitting devices, including first transmitting device 11 and second transmitting device 12 both capable of communicating with similar devices (such as receiving devices), (ii) a management system 15 (such as, in one non-limiting example a computer server) for selectively assigning transmitting tasks to the plurality of transmitting devices 11 and 12, (iii) a receiving device 20 capable of communicating with similar devices (such as transmitting devices 11 and/or 12), (iv) a communication network 30, such as, without limitation, the PSTN network or internet communication networks, (v) a database 50 to be populated with empirical performance data associated with the use of one or more of the transmitting devices, (vi) a mutual communication network 60 (such as, for example and without limitation, a LAN or WAN) between the management system 15 and the database 50 for the purpose of consulting the database for data and supplying updated data to the database 50.

In one embodiment, the transmitting devices are transmitting facsimile devices. In another embodiment, the transmitting devices can be multiple "fax cards" installed on a computer or plurality of computers. In yet another embodiment, the transmitting devices can be one or more computers running software adapted to use the T.38 protocol.

The historical performance data regarding the transmitting devices can include information relating to the performance of the particular selected transmitting device in isolation (i.e. "stand alone performance"), performance with a particular communication network path, performance with various transmittal options (without limitation, color, variable transmission speeds and compression ratios), performance with a particular receiving device, performance with a particular geographic area (in one embodiment based on area code of the receiving device), performance during chronological times (without limitation, weekdays vs. weekends; business hours vs. evening or night hours; peak times vs. non-peak times, etc.), performance with a particular transmitting system or combinations of the foregoing.

Figure 2:
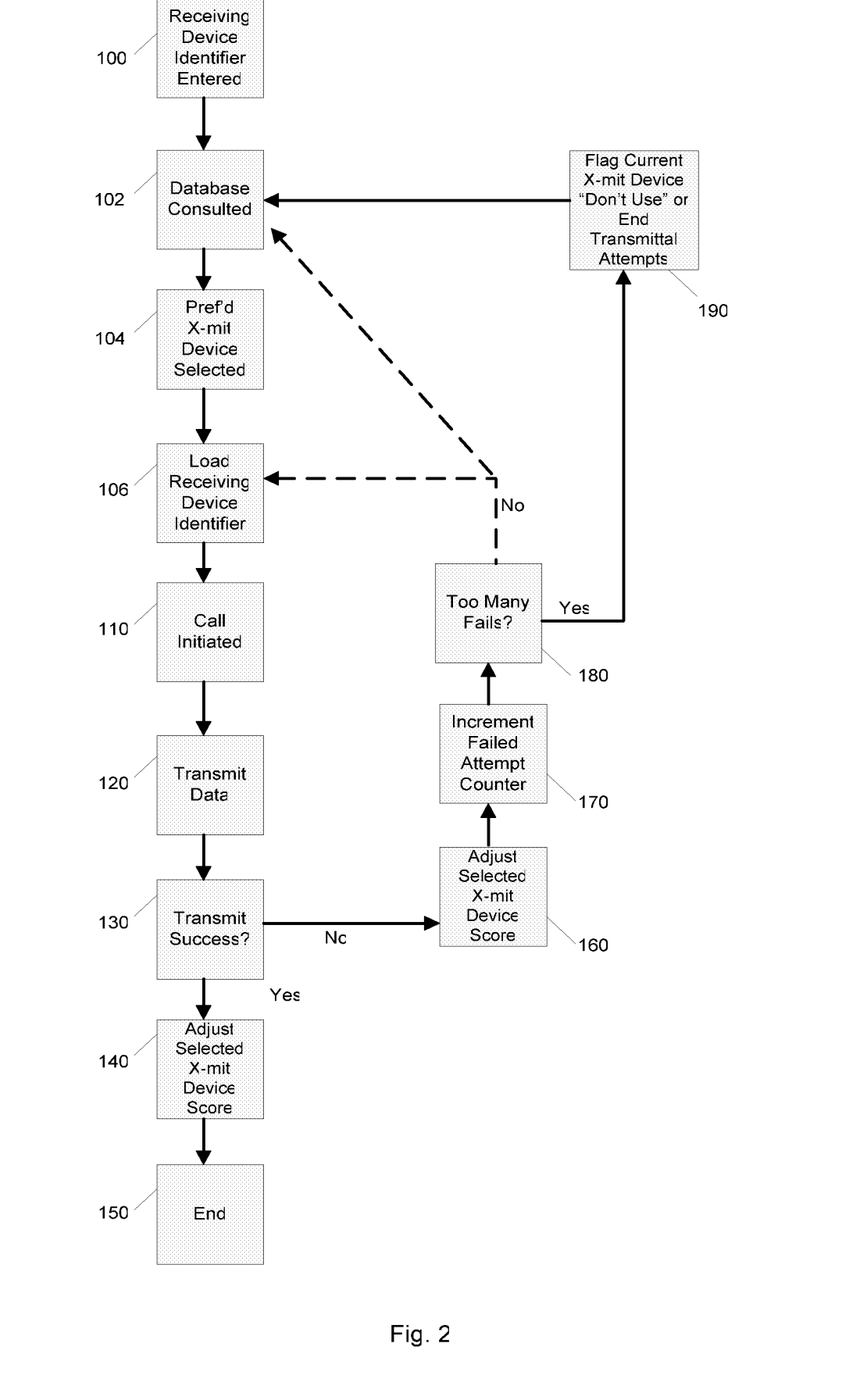
FIG. 2 depicts one embodiment of a method disclosed herein used to select a transmitting device.

FIG. 2 (which should be referred to in conjunction with FIG. 1) depicts one embodiment of the steps of operation of a method disclosed herein. In step 100 a unique addressing identifier (such as a telephone number) associated with a receiving device 20 can be entered into the transmitting device management system 15. In step 102 the database 50 can be consulted through a communication network 60 for the presence of alternative transmitting devices 11, 12 and associated performance scores regarding one or more of stand-alone performance, performance with a particular communication network path, performance with various transmittal options (without limitation, color, variable transmission speeds and compression ratios), performance with a particular receiving device, performance with a particular geographic area (in one embodiment based on area code of the receiving device), performance during chronological times (without limitation, weekdays vs. weekends; business hours vs. evening or night hours; peak times vs. non-peak times, etc.), performance with a particular transmitting system or combinations of the foregoing. In step 104 selection logic (such as a "best score" sort) can be applied to determine which of the plurality of transmitting devices 11, 12 is to be used. In step 106 the unique addressing identifier (such as a telephone number) associated with the receiving device 20 can be loaded into the selected transmitting device 11 or 12. In step 110 a transmittal is initiated by the selected transmitting device 11 or 12. In step 120 the selected transmitting device 11 or 12 attempts to transmit an electronic voice or data communication to the receiving device 20 through the communication network path 30. In step 130, the selected transmitting device 11 or 12 can note success or failure of the attempted transmission.

If the transmittal was successful, process flow can be routed to step 140 and the selected transmitting device's score can be adjusted (in one example, incremented). Scores that can be adjusted included the selected transmitting device's stand-alone performance score, the performance score with a particular communication network path, the performance score with various transmittal options (without limitation, color, variable transmission speeds and compression ratios), the performance score with a particular receiving device, the performance score with a particular geographic area (in one embodiment based on area code of the receiving device), the performance score during chronological times (without limitation, weekdays, weekends, business hours, evening hours, night hours, peak times, non-peak times, etc.), the performance score with a particular transmitting system or combinations of the foregoing. Following score adjustment after a successful transmittal, the process ends. At the end of the process, any reports, resource freeing, or other general system functions as are understood by those of ordinary skill in the art can take place.

If the transmittal failed, then the process flow can be routed to step 160 and the selected transmitting device's performance score can be adjusted (in one example, decremented) in the database 50. Again, scores that can be adjusted include the selected transmitting device's stand-alone performance score, the performance score with a particular communication network path, the performance score with various transmittal options (without limitation, color, variable transmission speeds and compression ratios), the performance score with a particular receiving device, the performance score with a particular geographic area (in one embodiment based on area code of the receiving device), the performance score during chronological times (without limitation, weekdays, weekends, business hours, evening hours, night hours, peak times, non-peak times, etc.), the performance score with a particular transmitting system or combinations of the foregoing.

Step 180 determines whether, after a failed attempt, the transmission should be reattempted. In the depicted embodiment, in step 170, a failed attempt score can be incremented. The failed attempt score can determine whether the transmission is attempted again at all or if it is required to be attempted using a different transmitting device.

In certain embodiments, the failed attempt score can be particular to the attempted transmission series and is not factored into a particular component's performance scores. In one embodiment, the failed attempt score is compared against a predefined threshold value such as, without limitation, a static number of acceptable attempts. The predefined number can be based on, without limitation, transmission error type, customer level (i.e. a "gold" member customer may be given a higher number of attempted transmissions than a "bronze" member customer) or time of day.

In another embodiment, the failed attempt score is not a static number but can be adjusted according to a variety of factors including, in one embodiment, resource availability. The adjustment of the number can also be based on other factors including, without limitation, transmission error type, customer level (i.e. a "gold" member customer may be given a higher number of attempted transmissions than a "bronze" member customer) or time of day. For example, at a time of high resource availability, a gold member's variable number could be infinite (until an event re-establishes a lower number) while a bronze member's variable number could be increased by a percentage of otherwise allowed attempts.

If, in step 180, the failed attempt score is less than the threshold value in control at the particular time, then the process flow can be routed to step 106 and transmission can be re-attempted.

There are several non-limiting options when a new transmission is attempted. In one embodiment, the same transmitting device can automatically be utilized to re-attempt transmission (direct return to step 106). In another embodiment, a different transmitting device can be required to be used. Alternatively, following step 180, the process could return to step 102 for reconsultation with the database. When the database is reconsulted it can be allowed to select the same transmitting device or it can be required to select an alternative transmitting device. Moreover, the database can be re-consulted based on the same or different consulting parameters and the database can select the same transmitting device based on the consulting or can be prevented from selecting the same transmitting device.

In the particular embodiment depicted in FIG. 2, if, in step 180 the failed attempt score is equal to or exceeds the predefined threshold value, then the process flow is routed to step 190. In step 190, the system is programmed to disallow re-selection of the currently selected transmitting device 11 or 12 for the current transmission. From step 190 process flow can then be routed to step 102 where a new transmitting device 11 or 12 can be selected and further transmittal attempts can continue with a newly selected transmitting device. Alternatively, if the failed attempt score is equal to or exceeds the threshold value, transmittal attempts can be aborted.

Figure 3:
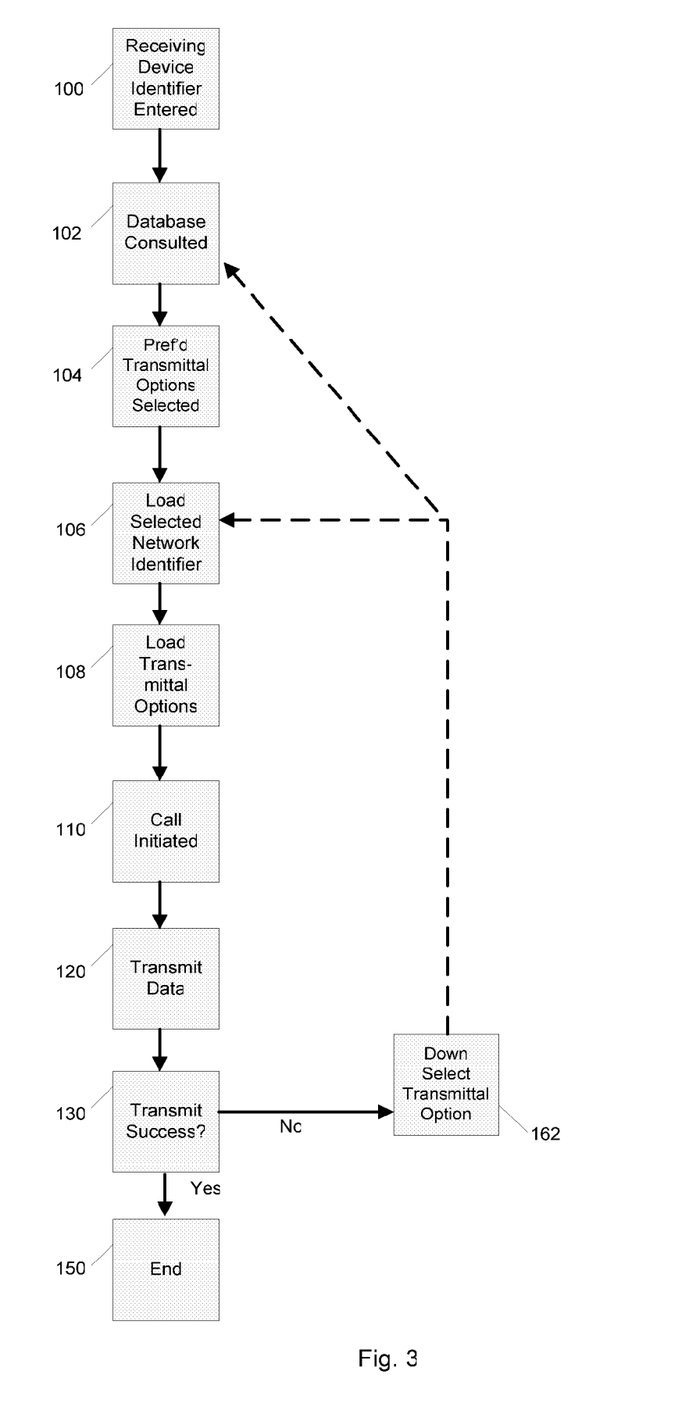
FIG. 3 depicts one embodiment of a method disclosed herein used to select a communication network path and transmitting options.

FIG. 3 (which should be referred to in conjunction with FIG. 1) depicts one embodiment of the steps of operation of the methods disclosed herein. The steps of operation of FIG. 3 are similar to the operation depicted in FIG. 2 except that a preferred communication network path and transmittal options are selected in combination. In one embodiment the alternate communication network paths can be routes provided by different carriers to the PSTN, routes to the internet or routes to IP networks. Alternate communication network paths can also more generally include, for example and without limitation, the PSTN vs. the internet. Transmittal options can be, without limitation, color, resolution, transmittal speed or compression ratios.

In the depicted embodiment in step 100 a receiving device identifier can be entered into a management system. In step 102 the management system can consult the database for preferred communication network paths and transmittal options. In steps 106 and 108, and as understood by one of ordinary skill in the art, required steps can be taken to implement the selection of the communication network path and transmittal options. For example, transmittal options can be selected, deselected or adjusted in the transmitting device. In step 110 a transmission can be initiated and in step 120 data can be transmitted. In step 130, the transmitting device 11 or 12 can note success or failure of the attempted transmission.

If the transmittal was successful, process flow can be routed to step 150, scores can be adjusted and the transmission session can be terminated. At the end of the process, any reports, resource freeing, or other general system functions as are understood by those of ordinary skill in the art can take place.

If the transmittal failed, then the process flow can be routed to step 162 wherein communication network path and/or transmitting options scores can be adjusted in the database 50.

In certain embodiments, this score adjustment can be a reduction in a parameter with many values (such as a change in maximum transmittal speed) or a deselection of an option such as color (as opposed to black and white). As described previously, a failed attempt score can be incremented. If allowable attempts remain, the transmitting device 11 or 12 can re-attempt transmission using the same communication network path with different transmitting options; a different communication network path with different transmitting options; a different communication network path with the same transmittal options; or the same communication network path with the same transmittal options.

Where not otherwise indicated, it is to be understood that the embodiment described in FIG. 3 operates similarly to the embodiment of FIG. 2 such that, for the sake of brevity, steps and methods, such as loop-exit error traps, that are commonly understood by those of ordinary skill in the art have not necessarily been shown or repeated.

Figure 4:
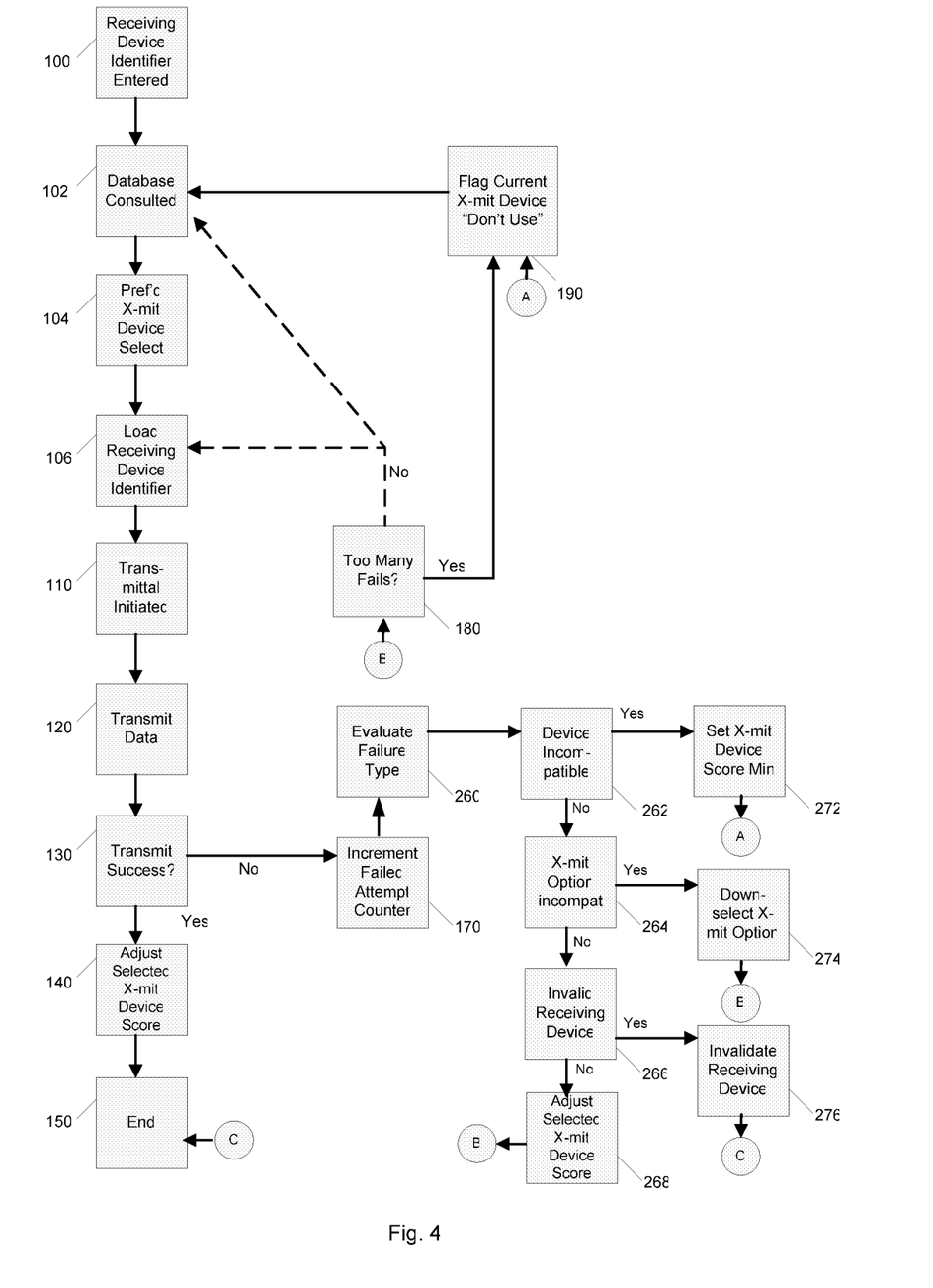
FIG. 4 depicts one embodiment of a method disclosed herein used to select a transmitting device with reselection options based on a particular communication transmission failure type.

FIG. 4 depicts another embodiment of the steps of operation of the methods disclosed herein. The steps of operation of FIG. 4 are similar to the operation depicted in FIG. 2 except that this embodiment provides more detail regarding potential treatment of various error types. In this depicted embodiment, at step 130, if the transmittal failed, process flow can be routed through step 170 (where the failed attempt counter can be incremented) to step 260. In step 260, the specific class of failure can be evaluated (in one embodiment through the use of an error code reported by the transmitting device 11 or 12). In step 262, if the error is a general device incompatibility error, process flow can be routed to step 272. In step 272, the score of the selected transmitting device 11 or 12 can be set to a minimum value so that the selected transmitting device 11 or 12 will generally not be selected in a subsequent similar transmittal situation when other transmitting devices are available. Process flow can then be routed to step 190 (depicted as the lettered link "A") where a new transmitting device 11 or 12 can be selected and transmittal attempts can continue if the failed attempt score has not exceeded the threshold value.

If, in step 262, the error is not a general device incompatibility error, process flow can be routed to step 264 for further handling of the error. In step 264, if the error is a transmittal option incompatibility error (such as, without limitation, the receiving device being unable to process a particular compression type), process flow can be routed to step 274. In step 274, the transmittal option can be down selected to a more common value so that the transmitting device 11 or 12 will not attempt to use the ineffective transmittal option in a subsequent similar transmittal situation. Process flow can then routed to step 180 (depicted as the lettered link "B") where the score of the new transmitting device 11 or 12 and/or transmittal options can be adjusted (as other transmitting devices and/or transmittal options may not suffer from the same incompatibility).

If, in step 264, the error is not a transmittal option incompatibility error, process flow can be routed to step 266 for further handling of the error. In step 266, if the error is an invalid receiving device error, process flow can be routed to step 276. In step 276, the receiving device (and/or associated unique addressing identifier) 20 can be recorded as invalid by appropriate means such as removing the receiving device 20 (and/or associated unique addressing identifier) from the database 50 and/or alerting a user that the receiving device 20 (and/or associated unique addressing identifier) is invalid. Process flow can then be routed to step 150 (depicted as the lettered link "C") and transmission attempts to the invalid recipient can be properly terminated.

If, in step 266, the error in not an invalid receiving device error, process flow can be routed to step 268 for further handling of the error. In step 268, no specific error type decision is made. Instead, step 268 functions as a default error handler to process undefined error types or unrecognized error types. In step 268, the transmitting device score can be decremented and process flow can then be routed to step 180 (depicted as the lettered link "B") where transmittal attempts can continue if the failed attempt score has not exceeded the threshold value. It is to be understood that, while three error types are shown in this embodiment, any number of types could be handled with process routing appropriate to handling each error type.

Figure 5:
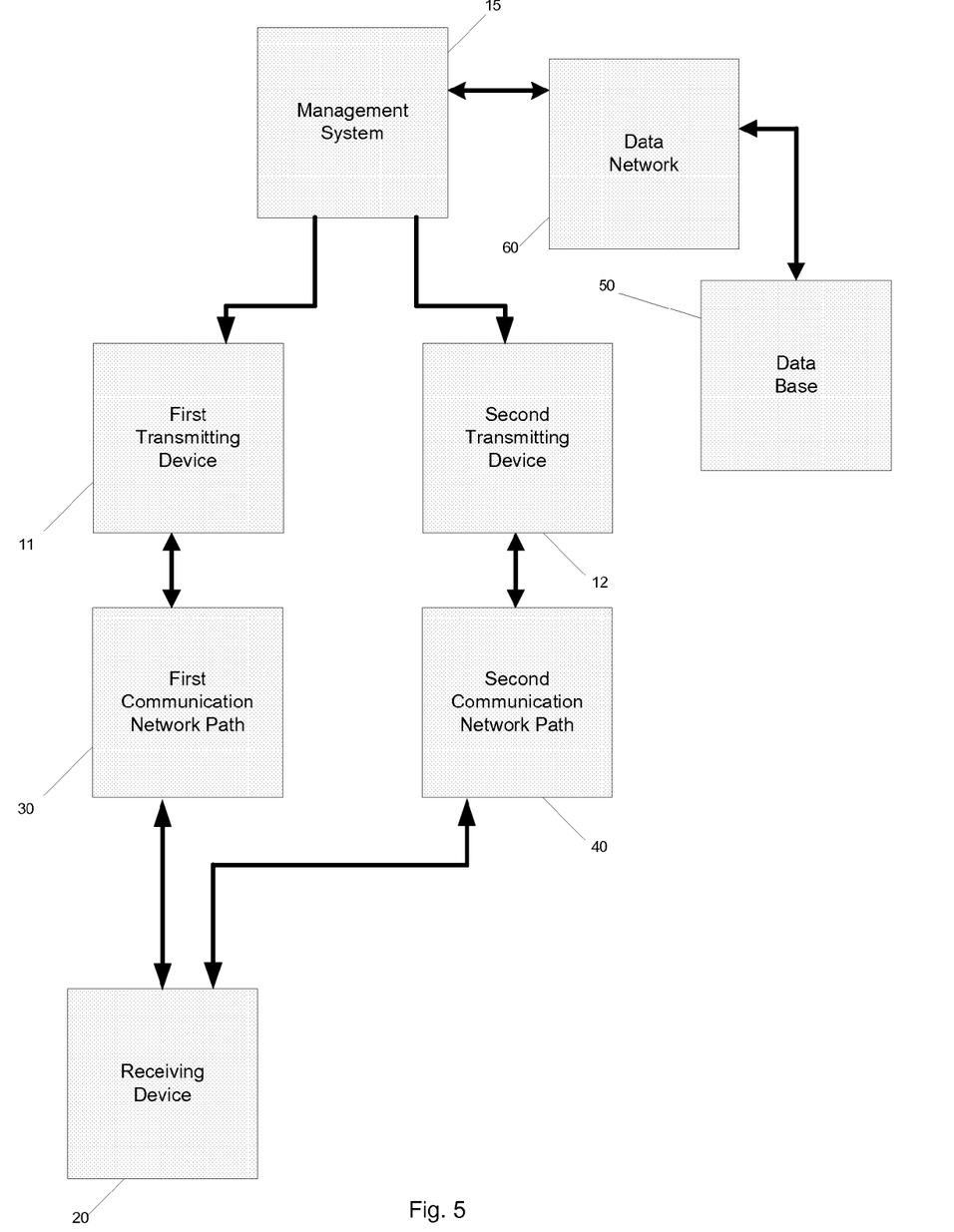
FIG. 5 depicts one embodiment of a system disclosed herein wherein the transmitting device and communication network path are linked or associated.

FIG. 5 depicts another embodiment of the systems and methods disclosed herein. This embodiment is similar to the embodiment depicted in FIG. 1 except that communication network paths 30 and 40 are linked or associated with first and second transmitting devices 11 and 12 respectively. In this embodiment selection of a transmitting device determines selection of a communication network path. Alternatively, selection of a communication network path determines selection of a transmitting device. Alternatively, the transmitting device and communication network path can be selected as a pair over other available pairs.

Figure 6:
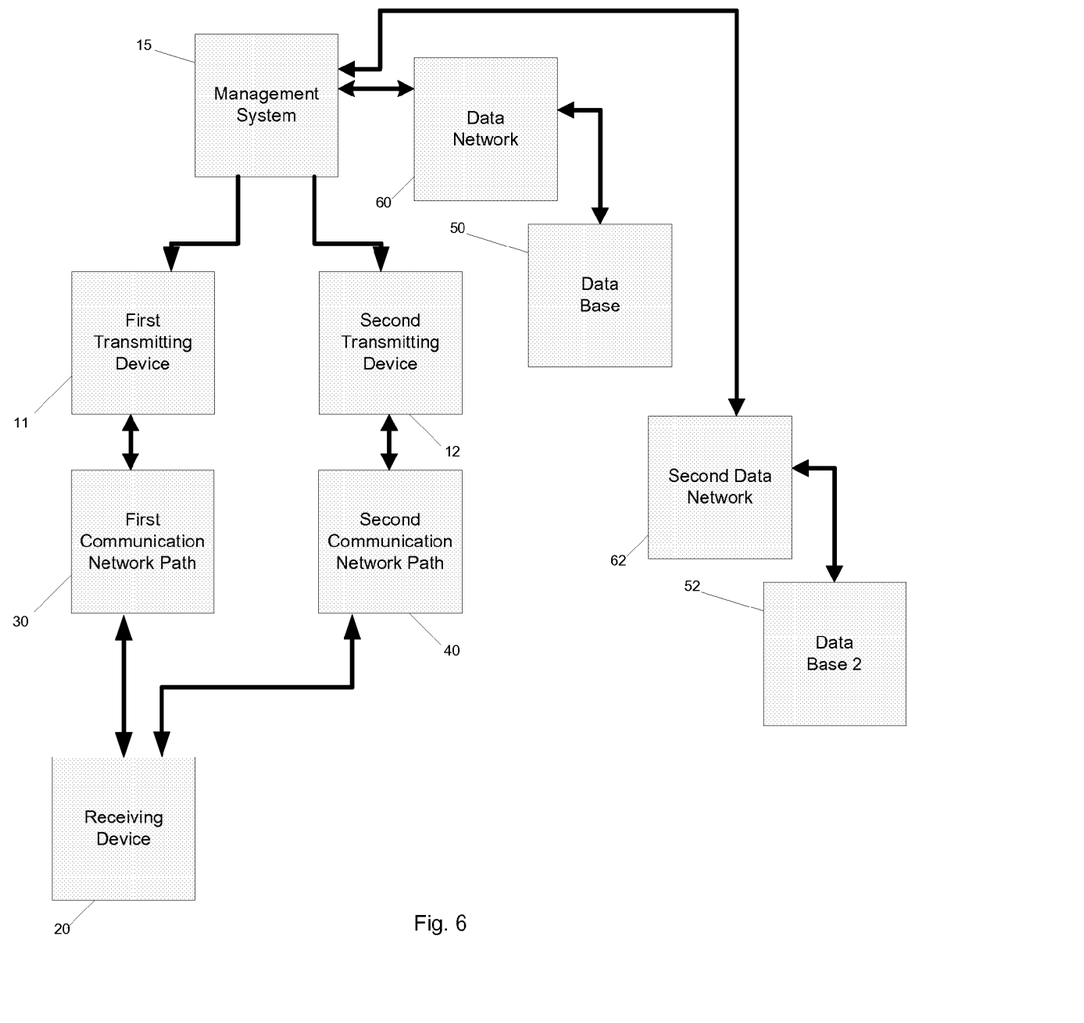
FIG. 6 depicts one embodiment of a system disclosed herein used to select a transmitting device using supplemental data.

FIG. 6 depicts another embodiment of the systems disclosed herein. This embodiment is similar to the embodiment depicted in FIG. 5 with the addition of a second database 52 that can be populated with externally defined data such as, in one non-limiting example, cost information associated with communication network paths. This embodiment includes second mutual communication network 62 (such as, for example and without limitation, a LAN or WAN) between the management system 15 and the database 52 for the purpose of consulting the database for data and optionally supplying updated data to the second database 52. In operation, data from the first database 50 and the second database 52 can be combined in any suitable manner to determine a performance score that is arrived at by a combination of the automatically updated historical information from the first database 50 and the externally defined data from database 52. It is to be understood that, while in this depicted embodiment, the first communication network 60 and the second communication network 62 as well as the first database 50 and the second database 52 are shown as separate networks and devices, separate networks and devices for each are not required.

The figures thus far have described outbound transmitting systems. The systems and methods disclosed herein can also be applied to inbound transmitting systems as described in FIGS. 7 and 8.

Figure 7:
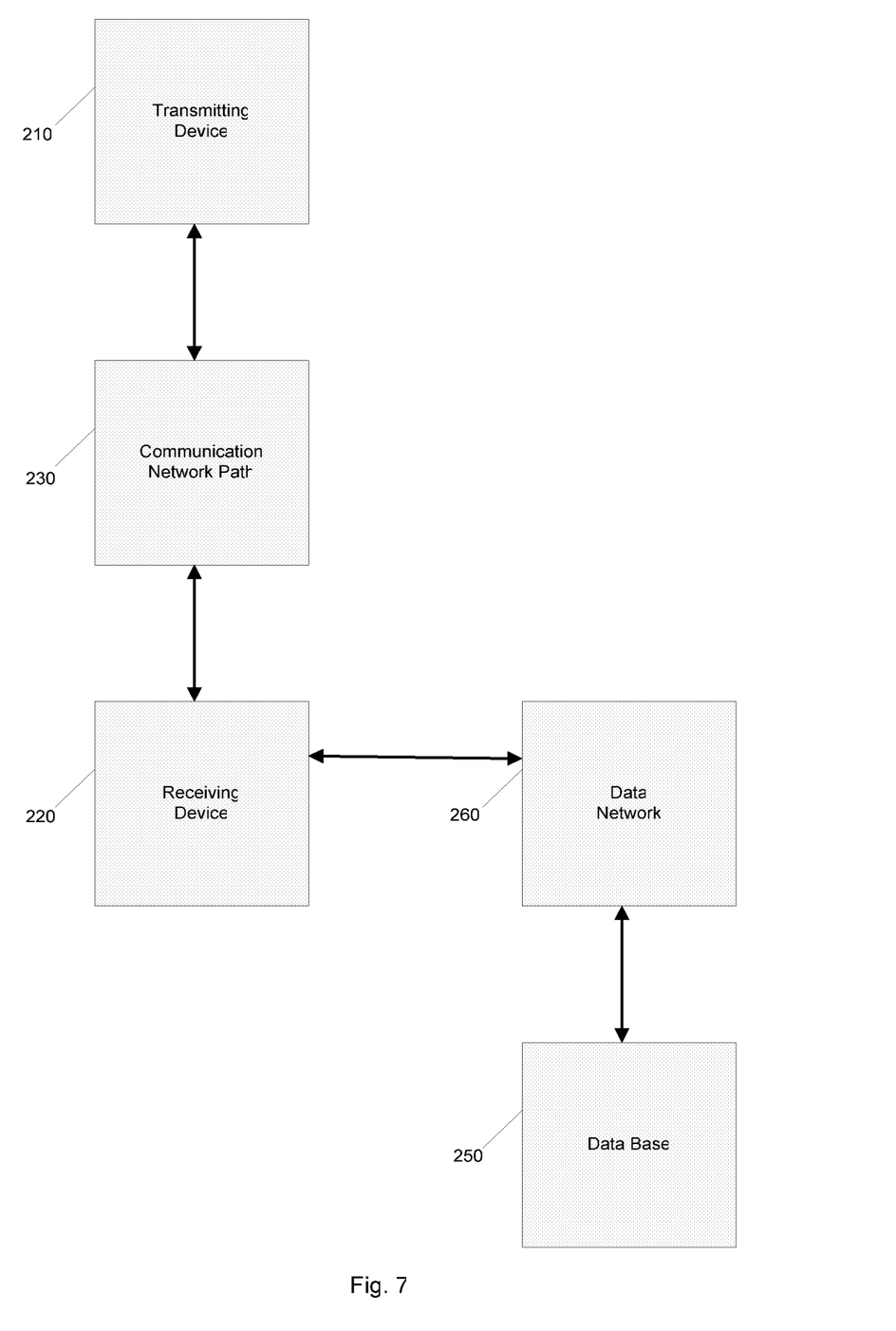
FIG. 7 depicts one embodiment of a system disclosed herein used to select receiving device protocols.

FIG. 7 depicts one embodiment of an inbound system disclosed herein. This depicted embodiment utilizes (i) a transmitting device 210 communicating with similar devices (such as receiving devices), (ii) a receiving device 220 capable of communicating with similar devices (such as the transmitting device 210), (iii) a communication network path 230, (iv) a database 250 to be populated with historical performance data associated with the use of the transmitting device 210, communication network path 230 or a transmittal situation of various combinations of system elements and other parameters, and (v) a mutual communication network 260 (such as, for example and without limitation, a LAN or WAN) between receiving device 220 and database 250 for the purpose of consulting the database for data and supplying updated data to the database 250.

Figure 8:
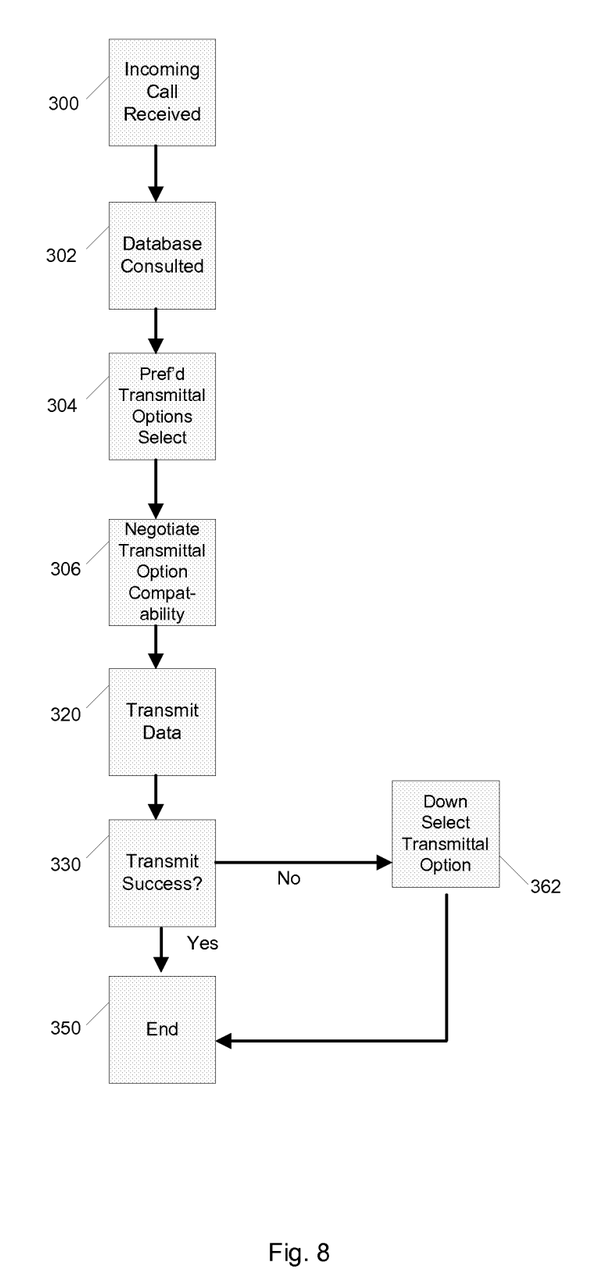
FIG. 8 depicts one embodiment of a method disclosed herein used to select receiving device protocols.

FIG. 8 (which should be referred to in conjunction with FIG. 7) depicts one embodiment of the steps of operation of a method disclosed herein. In step 300 an incoming transmission is detected. During transmission reception, information about the transmitting device can be detected. Information about the transmitting device can be based on a unique addressing identifier (such as a telephone number) associated with the transmitting device 210 that can be read by the receiving device 230. Alternatively, or in combination, information about the transmitting device can be based on information advertised by the transmitting device. Additionally, during transmission reception, other information about the transmission can be detected and optionally saved in a database and/or used by the receiving device to adjust the receiving protocols on the receiving device. Without limitation, such information about the transmission may include information about the communication pathway over which the transmission is transmitted, information about hardware over which the transmission is transmitted (such as routing switches), or media gateways by means of which the transmission is facilitated.

In step 302 the database 250 can be consulted through a communication network 260 for a historical performance record associated with the transmitting device 210, transmittal options (without limitation, color, variable transmission speeds and compression ratios), the communication network path 230 or various other transmittal situations. This evaluation may, for example and without limitation, be a sort to determine the highest (i.e. most compression, highest color resolution, etc.) transmittal options with a failure rate lower than a threshold. In step 304, preferred receiving device protocols can be selected for the receiving device 220 based on the evaluation in step 302. In step 306 the transmittal options can be negotiated between the transmitting device 210 and the receiving device 220. In step 310 the data transmission can be initiated between the transmitting device 210 and the receiving device 220 using the transmittal options selected and negotiated in steps 304 and 306.

In step 320, the voice or data communication can be transmitted between the transmitting device 210 and the receiving device 220. In step 330, if the transmittal was successful, process flow can be routed to step 350 and the process can be terminated. At the end of the process, any reports, resource freeing, or other general system functions as are understood by those of ordinary skill in the art can take place. Appropriate scores can also be adjusted. If, in step 350 the transmittal failed, then process flow can be routed to step 362 wherein the scores for the communication network path and/or transmitting options can be adjusted in the database 250. This adjustment can be a reduction in a parameter with many values (such as a change in maximum transmittal speed) or a deselection of an option such as color (as opposed to black and white).

In adjusting the scores of entire fax systems, combinations of components, the individual components therein independently and/or in conjunction with a variable (such as, without limitation, time of transmission), a simple unit increment can be used. Weighted increments, including, without limitation, fractions of current performance scores can also be used. Further, increment and decrement values can be symmetric or asymmetric.

One non-limiting example of a scoring scheme could comprise incrementing the performance score by 1 if a transmittal is successful, but decrementing the performance score by 5 if a transmittal fails. This weighting severely penalizes failures and causes performance scores of known failing options to rapidly drop in comparison to both successful options and options which have not been used.

Another non-limiting example of an alternative scoring scheme could comprise holding both a success value and an attempt value as fields in a single record in the database. On successful transmittal of a communication both the success value and the attempt value would be incremented. On a failed transmittal attempt, only the attempt value would be incremented. A single performance score can then be calculated as the ratio (dividend) of the success/attempt values in that record. This method does not unduly penalize options which have simply not been tested as their ratio scores can be comparable to options which have been used more often even though the absolute scalar values of successes may be radically different.

Another non-limiting example of an alternative scoring scheme could comprise storing multiple, individual communication attempts within a record and deriving a performance score from that information by calculation. This calculation could comprise, without limitation, a regression-based projection and could be applied to the multiple attempt data to anticipate an ongoing change-trend in a score.

Another non-limiting example of an alternative scoring scheme could comprise storing multiple, individual communication attempts including the associated date/time within a record and deriving a performance score from that information by calculation. This calculation could comprise, without limitation cyclical pattern detection to correlate scores with particular time/date cycles such as lower weekend availability.

Another non-limiting example of an alternative scoring scheme could comprise storing multiple, individual communication attempts including the associated transmission speed from the attempt within a record, combining this data with external information such as a table of transmission deriving a performance score from that information by calculation. This calculation could comprise, without limitation a projected lowest-cost score or a lowest-cost within a reliability window projection.

While a simple form of selection logic such as a "best score" sort has been described, it is anticipated that an other-than-best selection system may also be used to, for example and without limitation, balance usage or to occasionally explore the performance of less-than-best networks so that that database remains current on performance figures of all networks.

It is to be understood that, while the description of the invention disclosed herein discusses operations particular to the operation of the invention, general operations known to one of ordinary skill in the art (for example without limitation maintaining currency of a database by purging old records or entries that are considered too old to be suitably accurate) would be a part of normal operation. Additionally, while the methods disclosed herein have been described in particular stepped orders, it is to be understood that other orders and combinations of steps into single steps can be adopted within the scope of the presently-claimed invention. Moreover, it is to be understood that the present invention is not limited to the particular embodiments, materials, and examples described herein, as these can vary. It also is to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "a database" or "an alternative communication network" is a reference to one or more databases or alternative communication networks and includes equivalents thereof known to those skilled in the art and so forth.

Unless defined otherwise, all technical terms used herein have the same meanings as commonly understood by one of ordinary skill in the art to which this invention belongs. Specific methods, devices, and materials are described, although any methods and materials similar or equivalent to those described herein can be used in the practice or testing of the present invention.

What is claimed is:

1. A method comprising:
consulting a database for information relating to the performance history of one or more facsimile transmitting devices, said database including a performance score for one or more said facsimile transmitting devices, said performance score reflecting the success or failure of a transmission of a data communication for an individual one of one or more said facsimile transmitting devices;
using said performance score to select an individual facsimile transmitting device from the one or more facsimile transmitting devices; and,
attempting to transmit the data communication using said selected individual facsimile transmitting device.

2. The method according to claim 1 further comprising updating said performance score in said database for the selected individual facsimile transmitting device on said attempted transmission.

3. The method according to claim 2, wherein updating said performance score in said database comprises decrementing the performance score for the selected individual facsimile transmitting device in response to said attempted transmission of the data communication failing.

4. The method according to claim 1 wherein said selected individual facsimile transmitting device is a fax card installed on a computer server utilizing a T.38 protocol.

5. The method according to claim 1, wherein the performance score for one or more of said facsimile transmitting devices is set to a minimum value that has failed to transmit the data communication a maximum number of times.

6. The method according to claim 1, wherein using said performance score to select the individual facsimile transmitting device from the one or more facsimile transmitting devices comprises sorting in a list according to said performance score for one or more of said facsimile transmitting devices and selecting as the selected individual facsimile transmitting device the individual facsimile transmitting device in the list with a highest score.

7. The method according to claim 1, wherein said performance score reflects a performance of the individual one of one or more said facsimile transmitting devices in isolation, a performance of the individual one of one or more said facsimile transmitting devices with a communication network path, a performance of the individual one of one or more said facsimile transmitting devices configured with a set of transmittal options, a performance of the individual one of one or more said facsimile transmitting devices with an individual one of one or more facsimile receiving devices, a performance of the individual one of one or more said facsimile transmitting devices within a geographic area, a performance of the individual one of one or more said facsimile transmitting devices during a time period, and a performance of the individual one of one or more said facsimile transmitting devices with a transmitting system.

8. The method according to claim 1, wherein updating said performance score in said database for the selected individual facsimile transmitting device on said attempted transmission further comprises incrementing the performance score for the selected individual facsimile transmitting device in response to said attempted transmission of the data communication succeeding.

* * * * *